(12) United States Patent
Gale et al.

(10) Patent No.: US 10,131,212 B2
(45) Date of Patent: Nov. 20, 2018

(54) GATE ASSEMBLY FOR A MOTOR VEHICLE WITH LATCHING IN STOWED AND DEPLOYED POSITIONS

(71) Applicant: Indiana Mills & Manufacturing, Inc., Westfield, IN (US)

(72) Inventors: Steven Gale, Colfax, IN (US); Guy R. Dingman, West Lafayette, IN (US); Jeffrey A. King, Markleville, IN (US)

(73) Assignee: Indiana Mills & Manufacturing, Inc., Westfield, IN (US)

(*) Notice: Subject to any disclaimer, the term of this patent is extended or adjusted under 35 U.S.C. 154(b) by 98 days.

(21) Appl. No.: 15/349,112

(22) Filed: Nov. 11, 2016

(65) Prior Publication Data
US 2017/0129315 A1 May 11, 2017

Related U.S. Application Data

(60) Provisional application No. 62/253,949, filed on Nov. 11, 2015.

(51) Int. Cl.
*B60J 5/04* (2006.01)
*E05B 83/36* (2014.01)
*E05B 65/00* (2006.01)
*E06B 9/06* (2006.01)

(52) U.S. Cl.
CPC ......... *B60J 5/0487* (2013.01); *E05B 65/0007* (2013.01); *E05B 83/36* (2013.01); *E06B 9/0692* (2013.01)

(58) Field of Classification Search
CPC ........ B60J 5/0487; B60J 11/06; B60J 5/0472; B60J 5/047; E05B 65/0007; E05B 83/36; E06B 9/0692; E06B 2009/002; E06B 11/02; B62D 33/02; B60R 21/06; B60R 21/02
USPC ........................................... 160/97
See application file for complete search history.

(56) References Cited

U.S. PATENT DOCUMENTS

| | | | | |
|---|---|---|---|---|
| 8,328,235 B2 * | 12/2012 | Schneider | ............. | B60J 5/0487 280/748 |
| 8,465,050 B1 * | 6/2013 | Spindler | ................ | B60R 21/06 280/749 |
| 8,479,854 B1 * | 7/2013 | Gagnon | ................ | B60K 26/04 180/68.3 |

(Continued)

FOREIGN PATENT DOCUMENTS

| | | | | |
|---|---|---|---|---|
| DE | 202012006364 U1 * | 10/2013 | ......... | B66F 9/07545 |
| EP | 2684835 A1 * | 1/2014 | ............ | B60R 21/02 |

*Primary Examiner* — Beth A Stephan
(74) *Attorney, Agent, or Firm* — Barnes & Thornburg LLP

(57) ABSTRACT

A gate assembly for a motor vehicle having an open doorway includes an elongated gate having a pivoting end mounted to a first frame component at one side of the doorway and a latching end opposite the pivoting end, a latch striker pin mounted to a second frame component at the opposite side of the doorway, a latch cam at the latching end of the gate and having a latched position and an unlatched position, and an actuator having an engaged position in which the latch cam is in its unlatched position and a disengaged position in which the latch cam is in its latched position. The gate is pivotable from a stowed position adjacent to the one side of the doorway to a deployed position across the doorway in which the latch cam in its latched position engages the striker pin to secure the gate in its deployed position.

20 Claims, 10 Drawing Sheets

(56) References Cited

U.S. PATENT DOCUMENTS

| | | | | |
|---|---|---|---|---|
| 2002/0153718 A1* | 10/2002 | Schneider | ............... | B60J 5/042 280/748 |
| 2008/0079284 A1* | 4/2008 | Moreno | ............... | B60J 5/0472 296/146.12 |
| 2012/0032431 A1* | 2/2012 | King | ............... | B60J 5/0487 280/756 |
| 2013/0199097 A1* | 8/2013 | Spindler | ............... | B60J 5/047 49/394 |
| 2014/0210234 A1* | 7/2014 | Ricketts | ............... | B60R 21/06 296/193.03 |
| 2014/0225356 A1* | 8/2014 | Shinbori | ............... | B62D 63/04 280/751 |
| 2014/0306487 A1* | 10/2014 | Dobrot | ............... | B60J 5/0487 296/190.03 |
| 2015/0021955 A1* | 1/2015 | Szewczyk | ............... | B60R 21/06 296/190.03 |
| 2015/0175114 A1* | 6/2015 | Schroeder | ............... | B60R 21/06 296/190.03 |
| 2016/0325608 A1* | 11/2016 | Gagas | ............... | B60J 5/0472 |

\* cited by examiner

GATE ASSEMBLY FOR A MOTOR VEHICLE WITH LATCHING IN STOWED AND DEPLOYED POSITIONS

CROSS-REFERENCE TO RELATED APPLICATION

This patent application claims the benefit of, and priority to, U.S. Provisional Patent Application Ser. No. 62/253,949, filed Nov. 11, 2015, the disclosure of which is incorporated herein by reference.

FIELD OF THE INVENTION

The present invention relates generally to restraint systems for motor vehicles, and more specifically to such restraint systems in the form of a gate assembly at an open doorway of the motor vehicle which is movable between latched and stowed positions.

BACKGROUND

Various safety systems are used to protect occupants of vehicles. Some such systems include a gate that may be extended across an open doorway of a vehicle to contain an occupant therein and/or to block egress of the occupant therefrom.

SUMMARY

The present invention may comprise one or more of the features recited in the attached claims, and/or one or more of the following features and combinations thereof. In one aspect, a gate assembly for a motor vehicle having an open doorway may comprise an elongated gate having a pivoting end pivotally mounted to a first frame component of the motor vehicle at or near one of a rear portion and a front portion of the open doorway and a latching end opposite the pivoting end, a first latch striker pin mounted to a second frame component of the motor vehicle at or near the one of the rear portion and the front portion of the open doorway, the first striker pin located above or below the pivoting end of the elongated gate, a second latch striker pin mounted to a third frame component of the motor vehicle, first and second latch cams at or near the latching end of the gate, the first and second latch cams each having a latched position and an unlatched position, the gate pivotable from a stowed position adjacent to the one of the rear portion and the front portion of the open doorway in which the first latch cam in its latched position engages the first latch striker pin to secure the gate in the stowed position thereof to a deployed position across the open doorway in which the second latch cam in its latched position engages the second striker pin to secure the gate in the deployed position thereof, and an actuator having an engaged position in which the first and second latch cams are each in their unlatched positions and a disengaged position in which the first and second latch cams each are in their latched positions.

In another aspect, a gate assembly for a motor vehicle having an open doorway may comprise an elongated gate having a pivoting end pivotally mounted to a first frame component of the motor vehicle at or near one of a rear portion and a front portion of the open doorway and a latching end opposite the pivoting end, a first latch striker pin mounted to a second frame component at or near the other of the rear portion and the front portion of the open doorway, a first latch cam at or near the latching end of the gate, the first latch cam having a latched position and an unlatched position, the gate pivotable from a stowed position adjacent to the one of the rear portion and the front portion of the open doorway to a deployed position across the open doorway in which the first latch cam in its latched position engages the first striker pin to secure the gate in the deployed position thereof, and an actuator having an engaged position in which the first latch cam is in its unlatched position and a disengaged position in which the first latch cam is in its latched position.

In a further aspect, a gate assembly for a motor vehicle having an open doorway may comprise an elongated gate having a pivoting end pivotally mounted to a first frame component of the motor vehicle at or near one of a rear portion and a front portion of the open doorway and a latching end opposite the pivoting end, a first latch striker pin mounted to a second frame component at or near the one of the rear portion and the front portion of the open doorway, the first striker pin located below the pivoting end of the elongated gate, a first latch cam at or near the latching end of the gate, the first latch cam having a latched position and an unlatched position, the gate pivotable from a stowed position adjacent to the one of the rear portion and the front portion of the open doorway in which the first latch cam in its latched position engages the first latch striker pin to secure the gate in the stowed position thereof to a deployed position across the open doorway, and an actuator having an engaged position in which the first latch cam is in its unlatched position and a disengaged position in which the first latch cam is in its latched position.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWING

Figure 1:
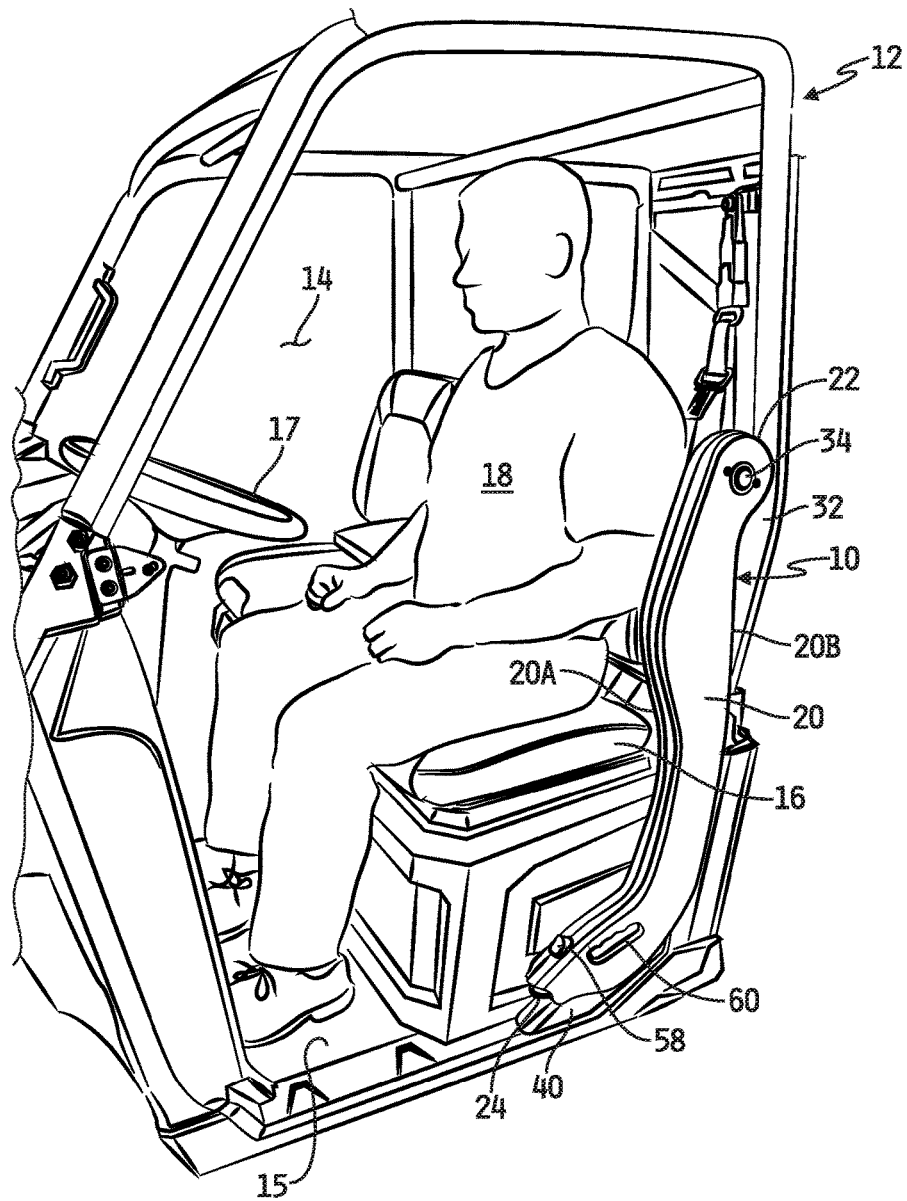
FIG. 1 is a perspective view of a motor vehicle with an embodiment of a movable gate assembly at an ingress/egress area thereof, and with a gate of the gate assembly shown in a stowed position.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Figure 2:
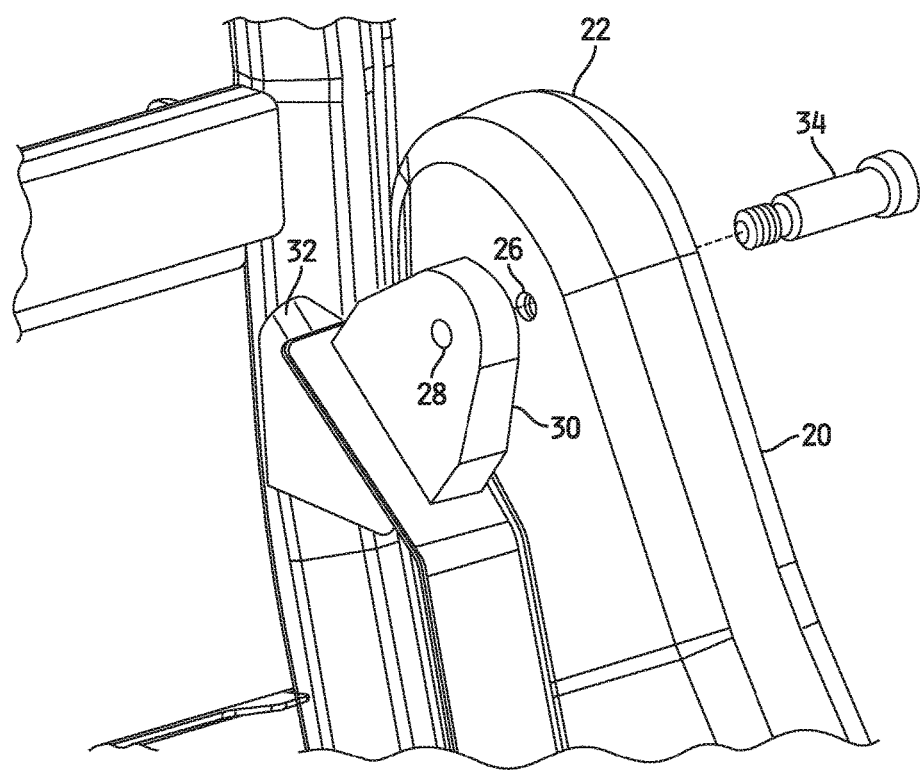
FIG. 2 is a magnified view of the pivoting end of the gate of FIG. 1 showing an example pivoting attachment thereof to the motor vehicle.
Figure 3:
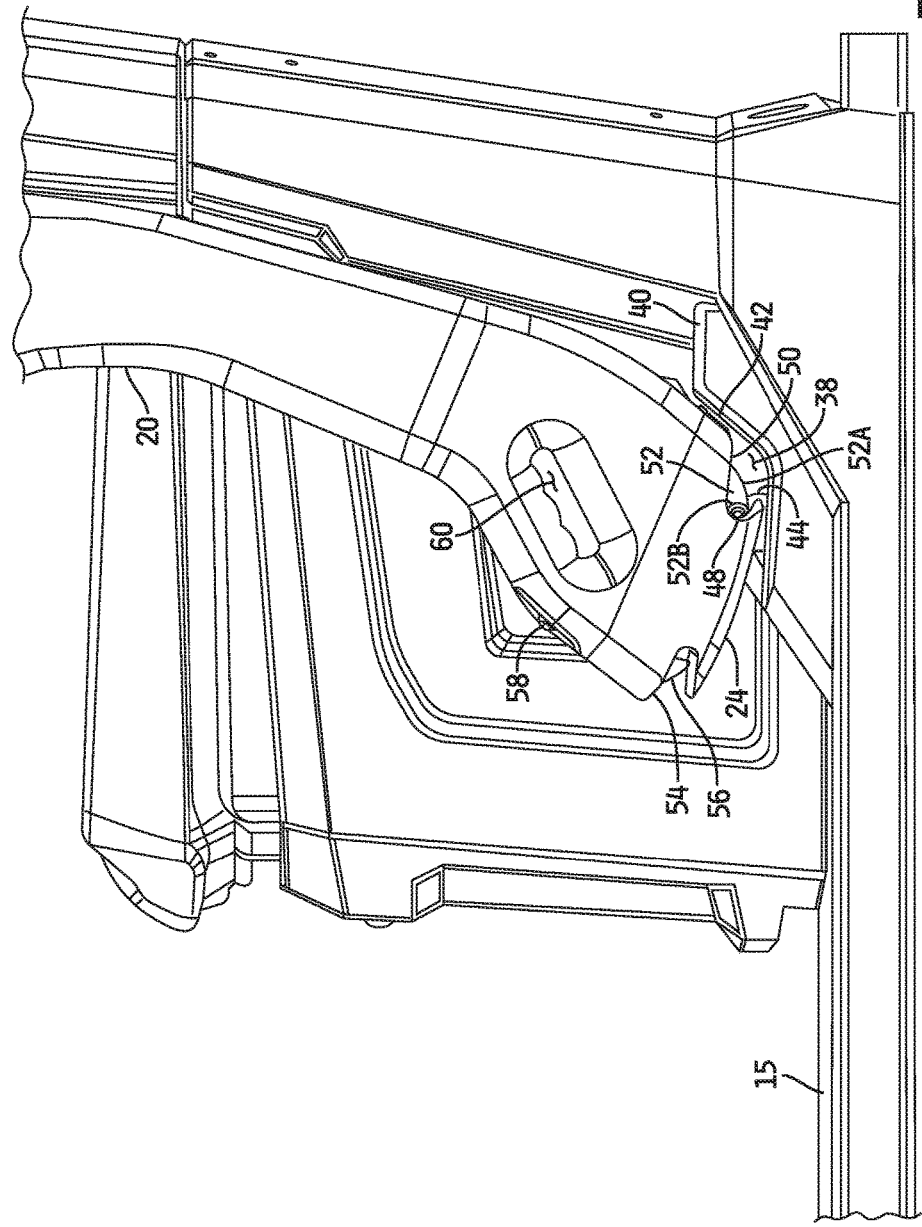
FIG. 3 is a magnified view of the latching end of the gate of FIG. 1 shown latched in its stowed position.

Referring now to FIGS. 1-8, a motor vehicle 12 is shown with an embodiment of a movable gate assembly 10, including an elongated gate 20, mounted to the motor vehicle 12 at an open doorway 14 thereof. In FIGS. 1 and 3, the gate 20 is shown in a stowed position and in FIGS. 7 and 8 the gate 20 is shown in a deployed position. As most clearly illustrated in FIGS. 1, 4, 6 and 7, the motor vehicle 12 has at least one seat 16 mounted in a cab area thereof, and in FIG. 1 an operator 18 of the vehicle 12 is shown seated in the seat 16. An open doorway 14 to the cab area provides for ingress/egress by the operator 18 to/from the cab area. The motor vehicle 12 may illustratively be any motor vehicle configured to accommodate, and provide for ingress/egress of, at least one operator and/or occupant, and examples include, but are not limited to, a lift truck, a recreational vehicle such as an all-terrain vehicle (ATV), dune buggy or other off-road vehicle, an automobile, a light, medium or heavy-duty truck, an electric vehicle, a utility vehicle, a commercial vehicle, an industrial vehicle, a racing vehicle, and the like.

Figure 7:
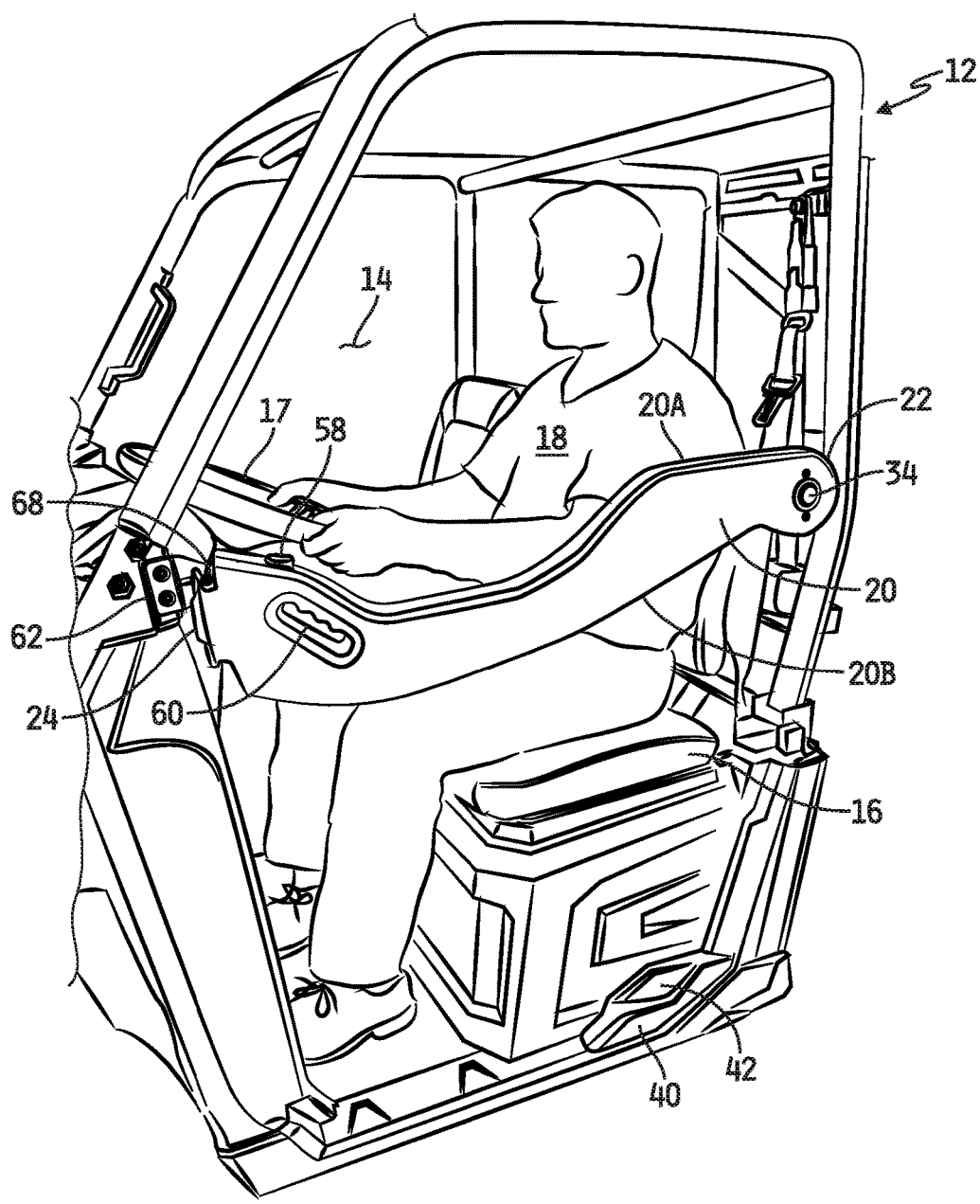
FIG. 7 is a perspective view similar to FIGS. 1, 4 and 6 showing the gate in the deployed position.
Figure 8:
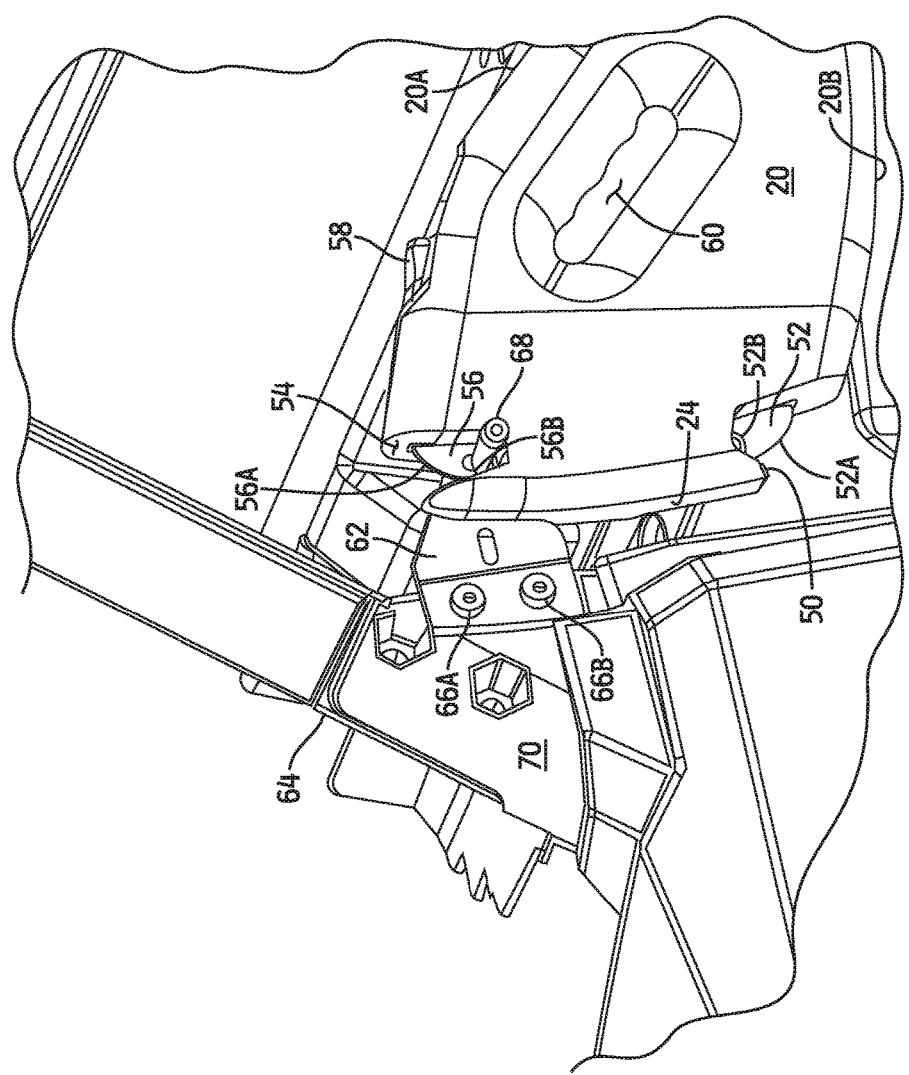
FIG. 8 is a magnified view of the latching end of the gate of FIG. 7 shown latched in its deployed position.

In the illustrated embodiment, the movable gate assembly 10 includes a gate 20, e.g., in the form of an elongated bar, having a top surface 20A, a bottom surface 20B opposite the top surface 20A, a pivoting end 22 and a latching end 24. As most clearly illustrated in FIG. 7 with the gate shown in its deployed position, the top surface 20A of the gate 20 is illustratively shaped to provide an operator/occupant barrier across the doorway 14 yet also facilitate access by the operator/occupant to the latching end 24 of the gate 20. For example, the top surface 20A near the pivoting end 22 is higher, relative to a floor 15 of the vehicle 12, than is the top surface 20A near the latching end 24. In one example embodiment, the height, relative to the floor 15 of the vehicle 12, of the top surface 20A of the gate 20 near the pivoting end 22 is selected to terminate at a horizontal plane, parallel with the planar surface of the floor 15, that intersects a mid-shoulder of an average-sized occupant 18, and the height, relative to the floor 15, of the top surface 20A near the latching end 24 is selected to terminate at a horizontal plane, parallel with the planar surface of the floor 15, that intersects or is just below the steering wheel 17 or other steering mechanism of the vehicle 20. It will be understood, however, that this disclosure contemplates other embodiments in which the height of the top surface 20A of the gate 20 relative the floor 15 is the same across the length of the gate 20 and/or is selected to be different near the pivoting end 22 and/or near the latching end 24 than that just described in the example embodiment. In any case, the pivoting end 22 of the gate 20 is pivotally attached to a frame or frame component 32 of the motor vehicle 12, and the latching end 24 is latchable to the motor vehicle 12 both in the stowed position as illustrated in FIGS. 1 and 3 and in the deployed position as illustrated in FIGS. 7 and 8.

Referring now to FIG. 2 in particular, an assembly view is shown illustrating pivotal attachment of the pivoting end 22 of the gate 20 to the motor vehicle 12. The motor vehicle 12 illustratively includes a plurality of interconnected frame components, and a bracket 30 is mounted to one such frame component 32 at a rear portion of the doorway 14. A bore 26 is provided through the gate 20 near the pivoting end 22 of the gate 20, and another bore 28 is provided through the bracket 30. The bores 26, 28 are aligned, and a fixation member 34 is passed through both bores 26, 28 to pivotally mount the gate 20 to the frame component 32. In the illustrated embodiment, the bores 26, 28 are threaded and the fixation member 34 is provided in the form of at least a partially threaded bolt, and in this embodiment the gate 20 is pivotally mounted to the frame component 32 by engaging the threaded bolt with the threaded bores 26, 28. In some embodiments, the bore 26 may include a counterbore on the side of the gate 20 in contact with the head of the threaded bolt, wherein such a counterbore is sized to receive the head therein. In other embodiments, the fixation member 34 may be provided in other conventional forms, such as a pin, axle, or the like. In any case, the pivoting end 22 of the gate 20 is operable to pivot about the fixation member 34 such that the gate 20 is pivotable between the stowed position illustrated in FIGS. 1 and 3, e.g., in which the elongated gate 20 is generally vertically disposed, and the fully deployed position illustrated in FIGS. 7 and 8, e.g., in which the elongated gate is generally horizontally disposed.

Referring now to FIGS. 1 and 3 in particular, at least a portion of the latching end 24 of the gate 20 is, in the stowed position of the gate 20, received within or adjacent to a notch or opening 42 (see also FIG. 6) in a boot or housing 40 mounted to the vehicle 12 along the floor 15 of the vehicle in a rear portion or aft region of the doorway 14 as illustrated in FIG. 1. In FIG. 3, the boot or housing 40 is shown in partial cutaway to show a latch plate 44 mounted to another frame component 38 of the motor vehicle 12 within the boot or housing 40, and extending transversely away from the latch plate 44 is a latch striker pin 48. Also illustrated in FIGS. 1 and 3 is a handle 60 near the latching end 24 of the gate 20. In the illustrated embodiment, the handle 60 is illustratively provided in the form of an elongated opening extending transversely through the gate 20 near the latching end 24 thereof. The opening 60 may illustratively include a series of peaks and valleys along the upper surface thereof, as illustrated by example in FIG. 3, to facilitate gripping of the handle 60 by a human hand. In other embodiments, the handle 60 may alternatively be provided in the form of one or more protrusions and/or one or more structures mounted to and/or integral with an exterior surface of the gate 20.

As illustrated in FIG. 3, the latching end 24 of the gate 20 defines a rearwardly-facing or aft mouth or channel 50 within which a movable latch cam 52 is located. The latch cam 52 is operatively connected to an actuator 58, e.g., a thumb-actuated button, located on the top surface 20A of the gate 20 near the latching end 24 of the gate 20, and the actuator 58 controls movement of the latch cam 52. In some alternative embodiments, the actuator 58 may be located at a different position on the gate 20 or located elsewhere on or within the motor vehicle 12, i.e., not located on or otherwise carried by the gate 20. The latch cam 52 illustratively includes a rearwardly and downwardly facing curved, e.g., arcuate, portion 52A and a forwardly and upwardly facing jaw portion 52B, and the latch cam 52 and the latch striker pin 48 are aligned in and along the pivoting plane of the gate 20 such that the latch cam 52 contacts the latch striker pin 48 when the gate 20 is pivoted downwardly to its stowed position with the latching end 24 of the gate 20 at least partially received within the boot or housing 40 as shown. In the illustrated embodiment, the latch cam 52 is biased to a latched position in which the jaw portion 52B is positioned relative to the mouth or channel 50 so as to trap and secure the latch striker pin 48 therein. In this embodiment, the latched position is the so-called "default" or "normal" position of the latch cam 52, and the latched position of the latch cam 52 is illustrated in FIG. 3.

Figure 5:
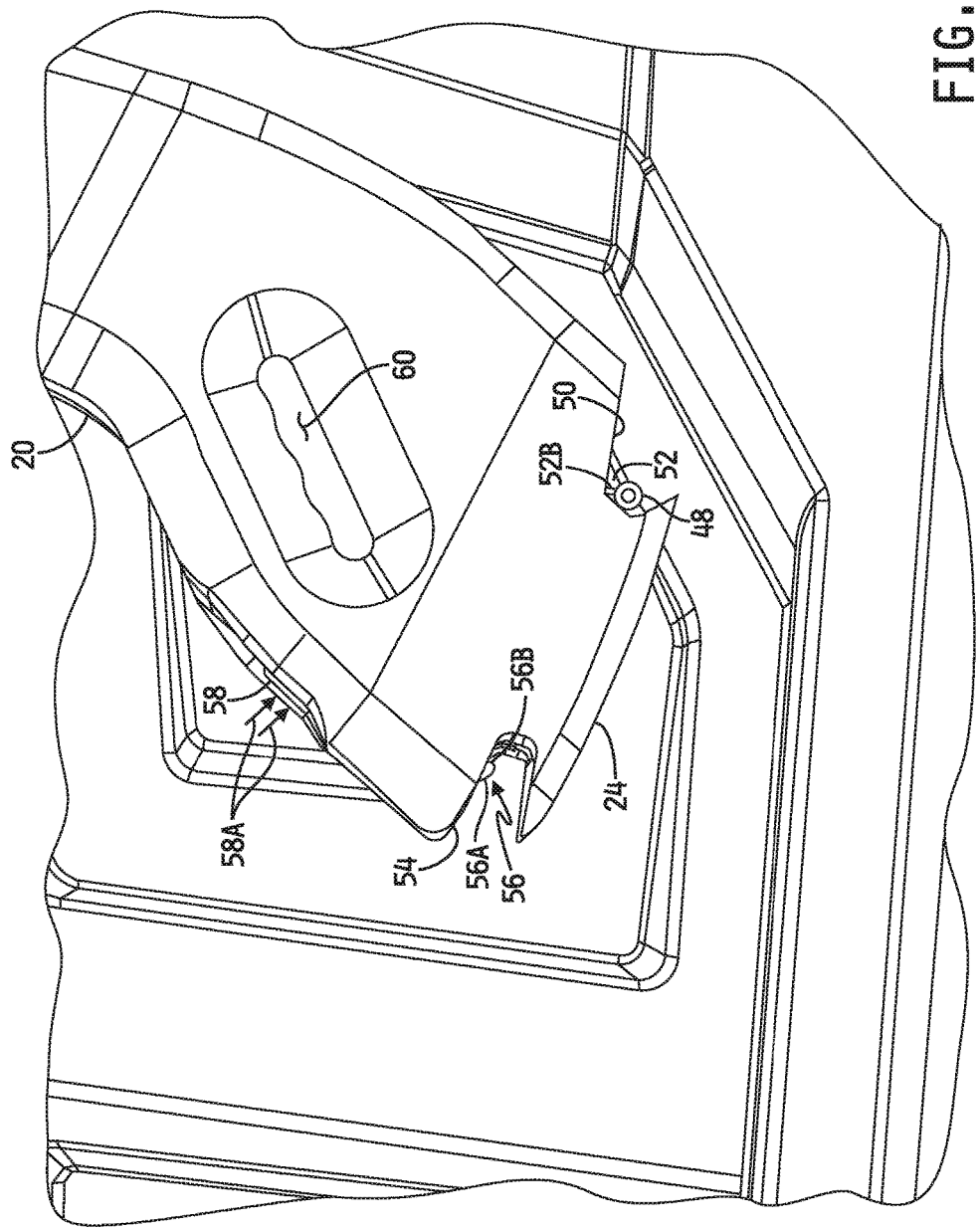
FIG. 5 is a magnified view of the latching end of the gate of FIG. 4 showing actuation of the gate latching mechanism.

The latch cam 52 may be moved under control of the actuator 58 from the latched position to an unlatched position in which the jaw portion 52B is at least partially retracted within the mouth or channel 50 as illustrated by example in FIG. 5 so as to allow free passage of the latch striker pin 48 fully into and out of the channel 50. Referring now specifically to FIG. 5, a magnified view of the latching end 24 of the gate 20 of FIG. 3 is shown in which the latch cam 52 is retracted into the mouth or channel 50 of the gate 20 in response to downward engagement, i.e., actuation, of the actuator 58 (represented by downward arrows 58A). The position of the latch cam 52 illustrated in FIG. 5 represents the unlatched position of the latch cam 52 in which the latch striker pin 48 is released from the jaw portion 52B of the latch cam 52.

In some embodiments, the latch cam 52 is also movable, in the absence of actuation of the actuator 58, upon contact with the latch striker pin 48 to receive the latch striker pin 48 within the jaw portion 52B. In such embodiments, for example, as the gate 20 is pivoted toward the stowed position, the latch striker pin 48 contacts the curved portion 52A of the latch cam 52 and forces the latch cam 52 forwardly and upwardly into the mouth 50 of the gate 20. When the latch striker pin 48 clears the curved portion 52A, the latch cam 52 returns, e.g., under bias, to the latched position illustrated in FIG. 3 in which the latch striker pin 48 is secured within the jaw portion 52B of the latch cam 52. In other embodiments, the latch cam 52 may be alternatively configured such that the actuator 58 must be engaged, i.e., actuated, to move the latch cam 52 from the latched to the unlatched position. In any case, the position of the gate 20 illustrated in FIG. 3, with the latch cam 52 in the latched position such that the latch striker pin 48 is secured within the jaw portion 52B, is referred to as the stowed position and/or as the stowed and latched position of the gate 20.

Figure 4:
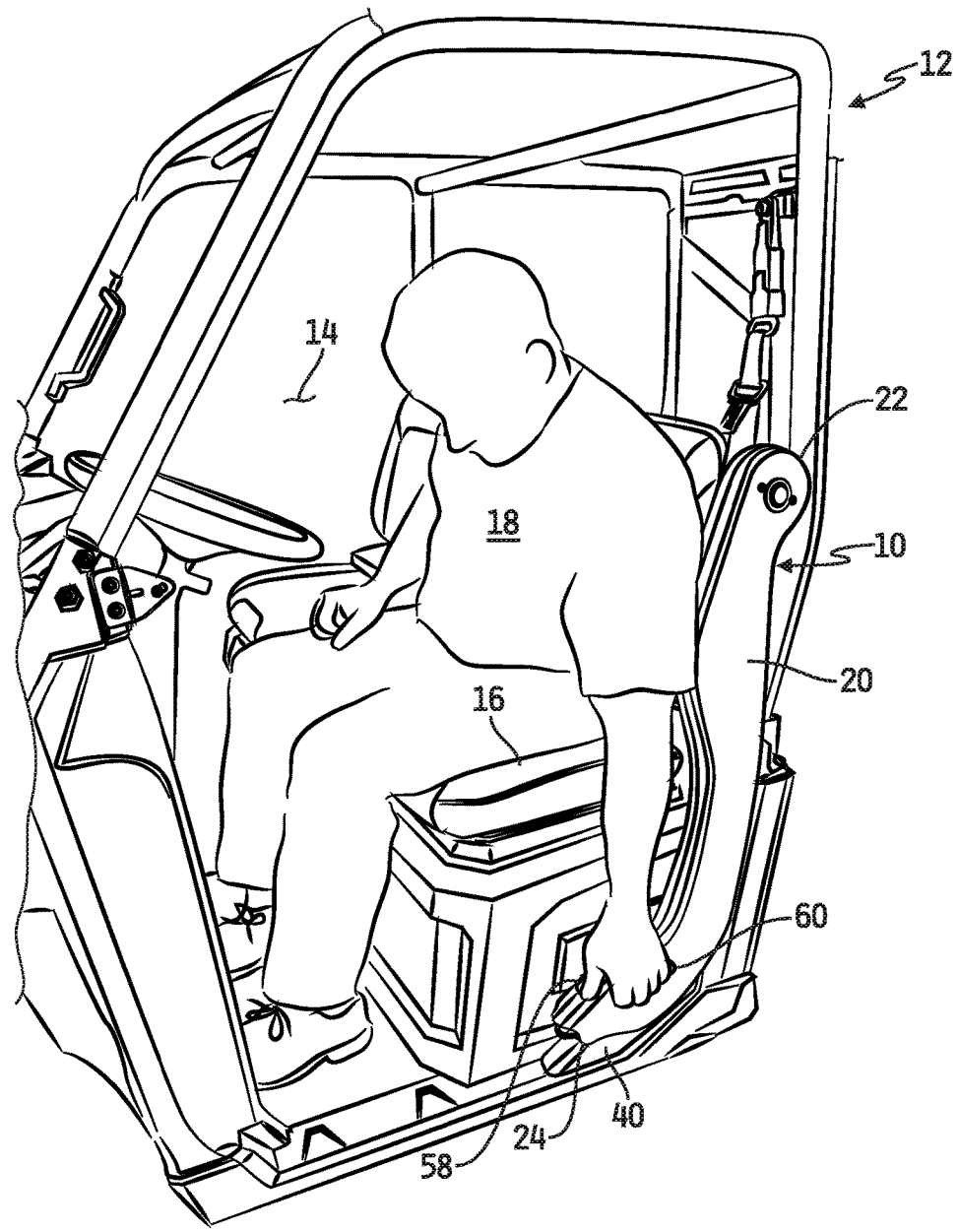
FIG. 4 is a perspective view similar to FIG. 1 showing actuation of the gate latching mechanism.
Figure 6:
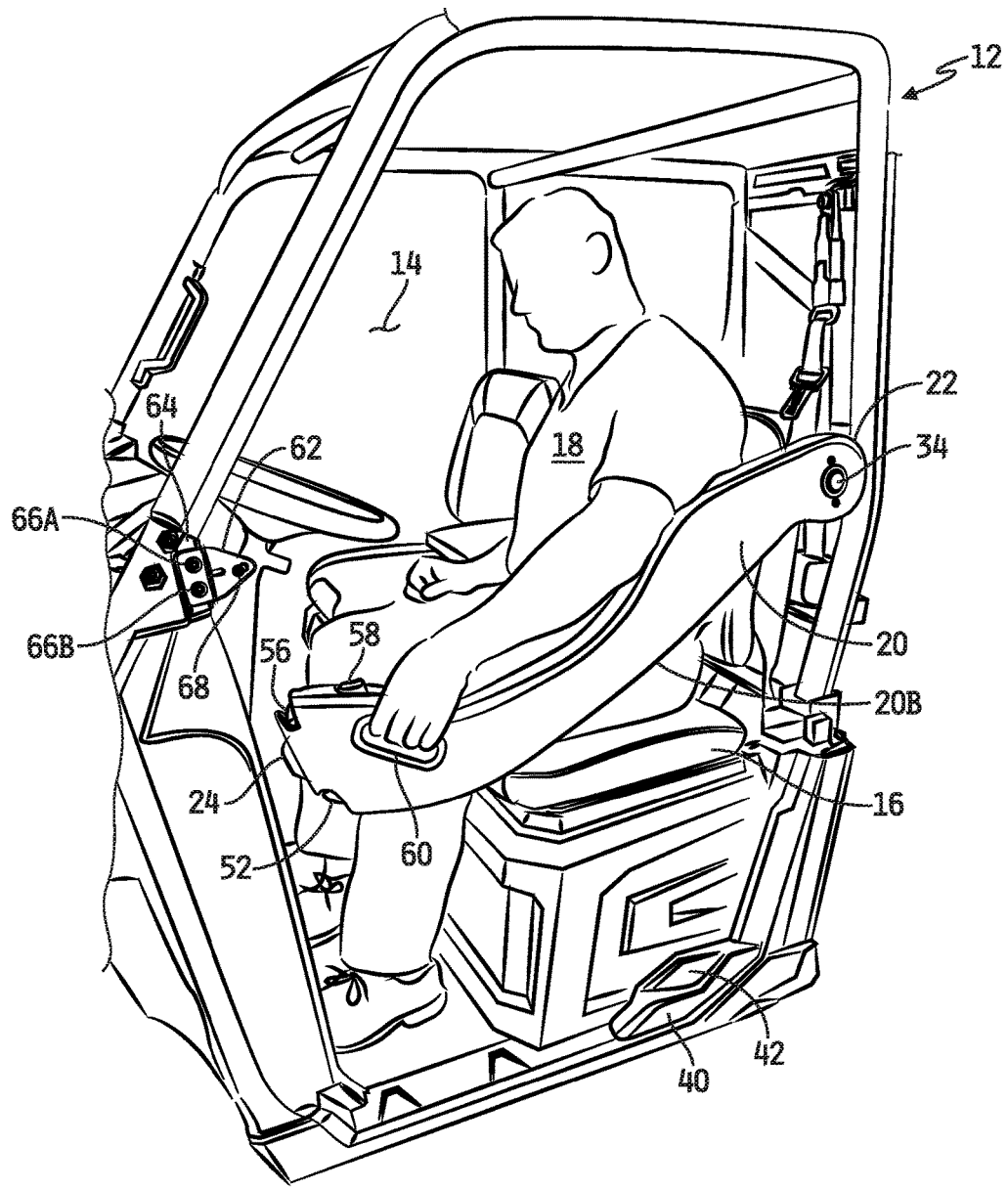
FIG. 6 is a perspective view similar to FIGS. 1 and 4 showing pivoting of the gate toward a deployed position.

Referring now to FIGS. 4-6 in particular, the gate 20 may be moved from the stowed and latched position illustrated in FIG. 3 to the deployed position by first manually engaging and actuating the actuator 58 to move the latch cam 52 from its latched position to its unlatched position in which the latch striker pin 48 is released from the jaw portion 52B of the latch cam 52, e.g., as described with respect to FIGS. 3 and 5, and then manually pivoting the gate 20 upwardly. The former is illustrated by example in FIG. 4 which depicts the operator 18 reaching down and manually actuating the actuator 58 to release the latch striker pin 48, and the latter is illustrated by example in FIG. 6 which depicts the operator 18 manually pivoting the gate 20 upwardly toward the latched or deployed position of the gate 20.

Referring now to FIGS. 6-8 in particular, the gate 20 may be moved to its deployed position by manually pivoting the gate 20 upwardly along its pivoting arc, as illustrated in FIG. 6, until the latching end 24 of the gate 20 latches to a latch plate 62 mounted to a frame component 64 of the vehicle 12 along a forward region or front portion of the doorway 14, as illustrated in FIGS. 7 and 8. Referring to FIGS. 7 and 8 in particular, a bracket 70 is mounted to another frame component 64 of the motor vehicle 12, and the latch plate 62 is attached to the bracket 70, e.g., via a pair of fixation members 66A, 66B, e.g., screws or bolts. It will be understood that while the latch plate 62 is shown exposed in FIGS. 7 and 8, the latch plate 62 may in other embodiments be housed within a boot or housing as is the latch plate 44 (FIG. 3). In any case, a latch striker pin 68 extends outwardly away from the latch plate 62.

As illustrated in FIGS. 3, 5-7 and 8, the latching end 24 of the gate 20 further defines a forward mouth or channel 54 within which a movable latch cam 56 is located. In the illustrated embodiment, the fore or forward latch cam 56 is, like the aft or rear latch cam 52 described above, biased to a latched position in which a jaw portion 56B of the latch cam 56 is positioned relative to the mouth or channel 54 to trap and secure the latch striker pin 68 therein. In this embodiment, the latched position of the latch cam 56 is the so-called "default" or "normal" position of the latch cam 56, and the latched position of the latch cam 56 is illustrated in FIGS. 7 and 8.

In the illustrated embodiment, the latch cam 56 is operatively connected to the actuator 58, and the actuator 58 controls movement of the latch cam 56 as described hereinabove with respect to the latch cam 52. As most clearly illustrated in FIG. 5, for example, the actuator 58, in its engaged position, simultaneously (or synchronously) controls, i.e., actuates, the latch cams 52 and 56 to their unlatched positions, and when the actuator is in its released (i.e., default) position the latch cams 52 and 56 both return, e.g., under bias, to their default latched positions. In alternative embodiments, the gate 20 may include two or more actuators via which the positions of the latch cams 52 and 56 may be controlled independently.

Referring again to FIG. 8 in particular, the latch cam 56 illustratively includes a forwardly and upwardly facing curved, e.g., arcuate, portion 56A opposite the downwardly and rearwardly facing jaw portion 56B, and the latch cam 56 and the latch striker pin 68 are aligned in and along the pivoting arc of the gate 20 such that the latch cam 56 contacts the latch striker pin 68 when the gate 20 is pivoted upwardly toward and to its deployed position as illustrated in sequence from FIGS. 6 to FIGS. 7 and 8. The latch cam 56 may be moved, by engaging and actuating the actuator 58, from its latched position to its unlatched position in which the jaw portion 56B is at least partially retracted within the mouth or channel 54 as illustrated by example in FIG. 5 so as to allow free passage of the latch striker pin 68 fully into and out of the channel 54, and the gate 20 may be then advanced to its deployed position (illustrated in FIGS. 7 and 8) whereupon the actuator is manually disengaged such that the latch cam 56 moves, e.g., under bias, from its unlatched to its latched position in which the latch striker pin 68 is trapped and secured within the jaw portion 56B of the latch cam 56.

In some embodiments, the latch cam 56 is also movable, in the absence of actuation of the actuator 58, upon contact with the latch striker pin 68 to receive the latch striker pin 68 within the jaw portion 56B. In such embodiments, for example, as the gate 20 is pivoted upwardly toward the deployed position, the latch striker pin 68 contacts the curved portion 56A of the latch cam 56 and forces the latch cam 56 upwardly into the mouth 54 of the gate 20. When the latch striker pin 68 clears the curved portion 56A, the latch cam 56 returns, e.g., under bias, to the latched position illustrated in FIGS. 7 and 8 in which the latch striker pin 68 is secured within the jaw portion 56B of the latch cam 56. In other embodiments, the latch cam 56 may be alternatively configured such that the actuator 58 must be engaged, i.e., actuated, to move the latch cam 56 from the latched to the unlatched position. In any case, the position of the gate 20 illustrated in FIGS. 7 and 8, with the latch cam 56 in the latched position with the latch striker pin 68 secured within the jaw portion 56B, is referred to as the deployed position and/or as the fully deployed or deployed and latched position of the gate 20. The gate 20 may be moved from the deployed position back to the stowed position by reversing the steps just described.

Figure 9:
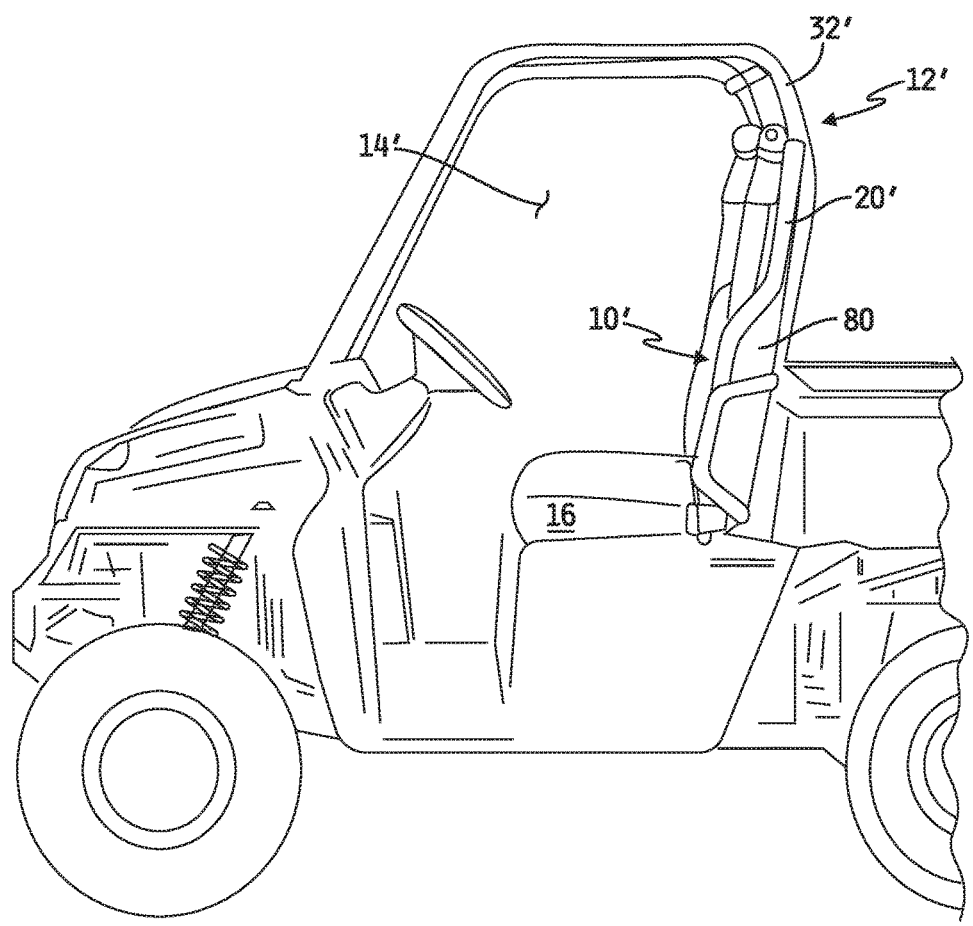
FIG. 9 is a side elevational view of a motor vehicle with another embodiment of a movable gate assembly at an ingress/egress area thereof, and with the gate shown in a stowed position.
Figure 10:
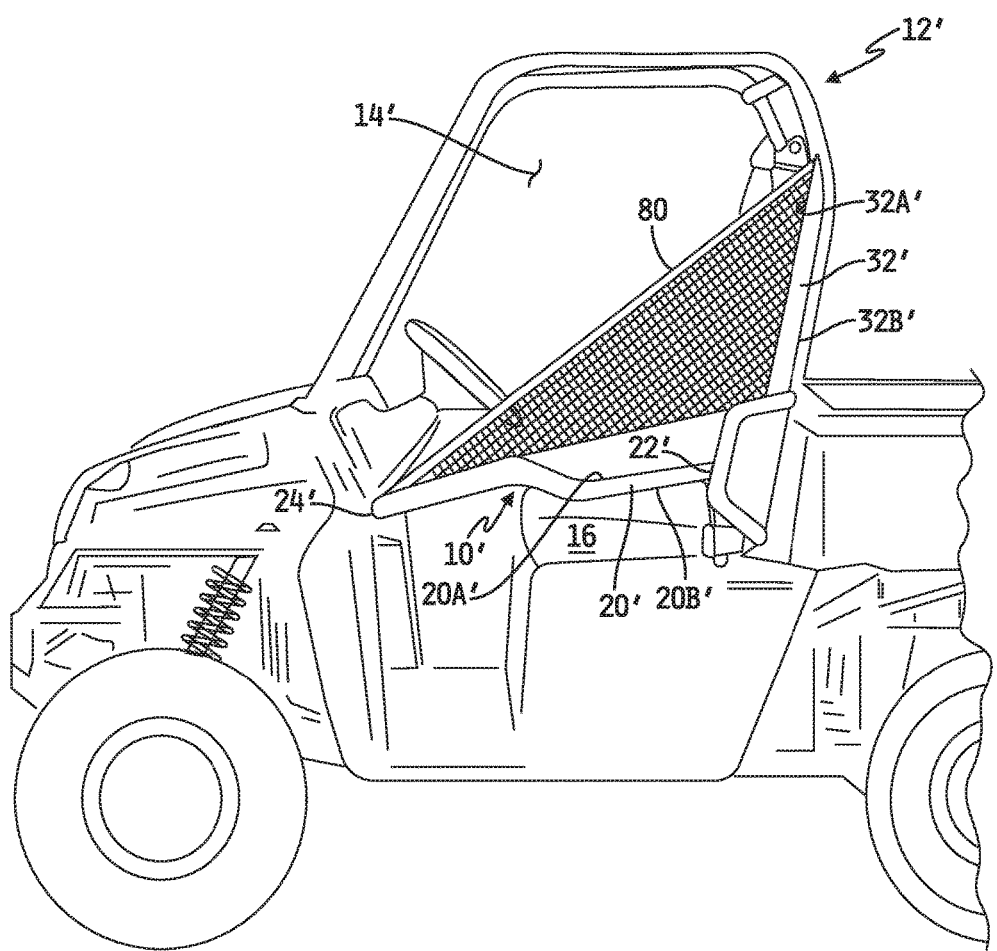
FIG. 10 is a magnified side elevational view of the motor vehicle of FIG. 9 shown with the gate in its latched position.

Referring now to FIGS. 9 and 10, a motor vehicle 12' is shown with another embodiment of a movable gate assembly 10' mounted at and to an open doorway 14' thereof. The motor vehicle 12' and the movable gate assembly 10' is identical or similar in many respects to the motor vehicle 12 and movable gate assembly 10 illustrated in FIGS. 1-8, and identical or like numbers are therefore used to identify identical or like components respectively. In one aspect, the movable gate assembly 10' illustrated in FIGS. 9 and 10 differ from the movable gate assembly 10 illustrated in FIGS. 1-8 in that the gate 20' is pivotable downwardly from a stowed position in which the latching end 24' thereof extends generally vertically upwardly from the vehicle 12' to a deployed position in which the latching end 24' extends generally horizontally across the open doorway of the motor vehicle 12'. The assembly 10' illustratively includes latching components, e.g., of the type illustrated and described with reference to FIGS. 1-8, for latching and securing the free end 24' of the gate 20' to the vehicle 12' in the deployed position thereof. The assembly 10' may or may not include latching components, e.g., of the of the type illustrated and described with reference to FIGS. 1-8, for latching and securing the free end 24' of the gate 20' to the vehicle 12' in the stowed position thereof.

In another aspect, the movable gate assembly 10' illustrated in FIGS. 9-10 differs from the movable gate assembly 10 illustrated in FIGS. 1-8 in that the movable gate assembly 10' further includes a flexible barrier 80 attached to at least a portion of the gate 20' and to at least a portion of the frame component 32' such that movement of the gate 20' from its stowed to its deployed position further results in deployment of the flexible barrier 80. In one embodiment, the flexible barrier 80 is attached to the top surface 20A' of the gate 20' along its length, e.g., from the pivoting end 22' to the free end 24', and is also attached to the forwardly-facing surface 32A' of the frame component 32' along its length. In some alternate embodiments, the flexible barrier 80 may be attached to the top surface 20A' only partially along the length of the gate 20' and/or may be attached to the forwardly-facing surface 32A only partially along the length of the frame component 32'. In other alternate embodiments, the flexible barrier 80 may be attached to the top surface 20A' of the gate 20' only at one or more discrete locations along or partially along the length of the top surface 20A', and/or may be attached to the forwardly-facing surface 32A' of the frame component 32' only at one or more discrete locations along or partially along the length of the forwardly-facing surface 32A'. In still other alternate embodiments, the flexible barrier 80 may be attached to the side or bottom surface 20B' of the gate 20' or to any combination of the top surface 20A', side or bottom surface 20B' of the gate 20', and/or may be attached to the side or rearwardly-facing surface 32B' of the frame component 32' or to any combination of the forwardly-facing surface 32A', side or rearwardly-facing surface 32B' of the frame component 32'. In any case, the flexible barrier 80 may be any flexible material or composite and examples include, but are not limited to, nylon, canvas, cloth, plasticized cloth, synthetic or other material in the form of a transparent, translucent or opaque sheet or net, or the like. It will further be understood that a flexible barrier 80 of the type illustrated in FIGS. 9 and 10 may alternatively or additionally be included as part of or integral with the movable gate assembly 10 illustrated in FIGS. 1-8.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, while the gate 20, 20' has been illustrated and described as having a pivoting end 22, 22' mounted to a frame component at or near a rear portion of the open doorway 14 and a latching end 24, 24' configured to be releasably latched at or near a front portion of the open doorway 14, it will be understood that such ends of the gate 20, 20' may be reversed in alternate embodiments such that the pivoting end 22, 22' is mounted to a frame component at or near the front portion of the open doorway 14, and the latching end 24 is configured to be releasably latched at or near the rear portion of the open doorway 14. In still other alternate embodiments, the gate assembly 10, 10' may be configured such that the pivoting end 22, 22' and the latching end 24, 24' of the gate 20, 20' is pivotable/latchable anywhere along the doorway 14. In any such embodiments, the latching components for the stowed position of the gate 20, 20' will be suitably located and mounted relative to the open doorway 14, e.g., below or above the pivoting end 22, 22' of the gate 20, 20'.

As another example, in some embodiments the latching cams 52 and 56 may not be located at or adjacent to the latching end 24 of the gate 20, 20', but may instead be located elsewhere along the gate 20, 20'. In the embodiments illustrated in FIGS. 1-10, and/or in alternative embodiments just described, the latching cams 52 and 56 may alternatively still be located remotely from each other. As yet another example, while the latching cams 52 and 56 are illustrated and described as being manually actuatable, e.g., via a button 58 or other conventional, manually actuatable structure, the latching cam 52 and/or the latching cam 56 may alternatively be configured to be manually or automatically actuated via one or more conventional electrical, electromechanical, hydraulic or pneumatic systems operatively coupled to one or more conventional switches and/or sensors located anywhere on or within the vehicle 12, 12' and/or anywhere on or within the gate 20, 20' or other component of the assembly 10, 10'.

What is claimed is:

1. A gate assembly for use with a motor vehicle having an open doorway defining a front portion and a rear portion opposite the front portion, the gate assembly comprising:

an elongated gate having a pivoting end configured to be pivotally mounted to a first frame component of the motor vehicle at or near one of the rear portion and the front portion of the open doorway and a latching end opposite the pivoting end, a first latch striker pin configured to be mounted to a second frame component of the motor vehicle at or near the one of the rear portion and the front portion of the open doorway above or below the pivoting end of the elongated gate, a second latch striker pin configured to be mounted to a third frame component of the motor vehicle, first and second latch cams at or near the latching end of the gate, the first and second latch cams each having a latched position and an unlatched position, the gate pivotable from a stowed position in which the first latch cam in its latched position is configured to engage the first latch striker pin to secure the gate in the stowed position thereof to a deployed position in which the second latch cam in its latched position is configured to engage the second striker pin to secure the gate in the deployed position thereof, and an actuator having an engaged position in which the first and second latch cams are each in their unlatched positions and a disengaged position in which the first and second latch cams each are in their latched positions.

2. The gate assembly of claim 1, wherein the first and second latch cams are biased to their latched positions.

3. The gate assembly of claim 1, wherein the actuator is carried by the elongated gate.

4. The gate assembly of claim 3, wherein the actuator is positioned near or adjacent to the latching end of the elongated gate.

5. The gate assembly of claim 1, wherein
the elongated gate in its stowed position is vertically positioned with the latching end of the elongated gate facing downwardly.

6. The gate assembly of claim 5, wherein the elongated gate in its deployed position is horizontally positioned.

7. The gate assembly of claim 1, wherein
the elongated gate in its stowed position is vertically positioned with the latching end of the elongated gate facing upwardly.

8. The gate assembly of claim 7, wherein the elongated gate in its deployed position is horizontally positioned.

9. The gate assembly of claim 1, wherein the elongated gate defines a handle adjacent to or near the latching end of thereof.

10. The gate assembly of claim 1, further comprising a flexible barrier attached to the elongated gate and configured to be attached to the first frame component, the flexible barrier having a stowed position when the gate is in its stowed position, and a deployed position extending at least partially along and upwardly from the gate when the gate is in its deployed position.

11. A gate assembly mounted/used on a motor vehicle having an open doorway, comprising:
an elongated gate having a pivoting end pivotally mounted to a first frame component of the motor vehicle at or near one of a rear portion and a front portion of the open doorway and a latching end opposite the pivoting end, a first latch striker pin mounted to a second frame component at or near the other of the rear portion and the front portion of the open doorway, a first latch cam at or near the latching end of the gate, the first latch cam having a latched position and an unlatched position, the gate pivotable from a stowed position adjacent to the one of the rear portion and the front portion of the open doorway to a deployed position across the open doorway in which the first latch cam in its latched position engages the first striker pin to secure the gate in the deployed position thereof, and an actuator having an engaged position in which the first latch cam is in its unlatched position and a disengaged position in which the first latch cam is in its latched position.

12. The gate assembly of claim 11, wherein the actuator is carried by the elongated gate.

13. The gate assembly of claim 12, wherein the actuator is positioned near or adjacent to the latching end of the elongated gate.

14. The gate assembly of claim 11, wherein the elongated gate defines a handle adjacent to or near the latching end of thereof.

15. The gate assembly of claim 11, further comprising:
a second latch striker pin mounted to a third frame component at or near the one of the rear portion and the front portion of the open doorway, the second striker pin located below the pivoting end of the elongated gate, and a second latch cam at or near the latching end of the gate, the second latch cam having a latched position and an unlatched position, wherein, with the gate in its stowed position, the second latch cam in its latched position engages the second latch striker pin to secure the gate in the stowed position thereof, and wherein the second latch cam is in its unlatched position when the actuator is in its engaged position and the second latch cam is in its latched position when the actuator is in its disengaged position.

16. A gate assembly for use with a motor vehicle having an open doorway defining a front portion and a rear portion opposite the front portion, the gate assembly comprising:
an elongated gate having a pivoting end configured to be pivotally mounted to a first frame component of the motor vehicle at or near one of the rear portion and the front portion of the open doorway and a latching end opposite the pivoting end, a first latch striker pin configured to be mounted to a second frame component at or near the one of the rear portion and the front portion of the open doorway below the pivoting end of the elongated gate, a first latch cam at or near the latching end of the gate, the first latch cam having a latched position and an unlatched position, the gate pivotable from a vertical stowed position in which the first latch cam in its latched position is configured to engage the first latch striker pin to secure the gate in the stowed position thereof to a horizontal position, and an actuator having an engaged position in which the first latch cam is in its unlatched position and a disengaged position in which the first latch cam is in its latched position.

17. The gate assembly of claim 16, wherein the actuator is carried by the elongated gate.

18. The gate assembly of claim 16, wherein the actuator is positioned near or adjacent to the latching end of the elongated gate.

19. The gate assembly of claim 16, wherein the elongated gate defines a handle adjacent to or near the latching end of thereof.

20. The gate assembly of claim 16, further comprising:
- a second latch striker pin configured to be mounted to a third frame component at or near the other of the rear portion and the front portion of the open doorway, and
- a second latch cam at or near the latching end of the gate, the second latch cam having a latched position and an unlatched position,
- wherein, when the gate is in its deployed position, the second latch cam in its latched position is configured to engage the second latch striker pin to secure the gate in the deployed position thereof,
- and wherein the second latch cam is in its unlatched position when the actuator is in its engaged position and the second latch cam is in its latched position when the actuator is in its disengaged position.

* * * * *